Figure 1:
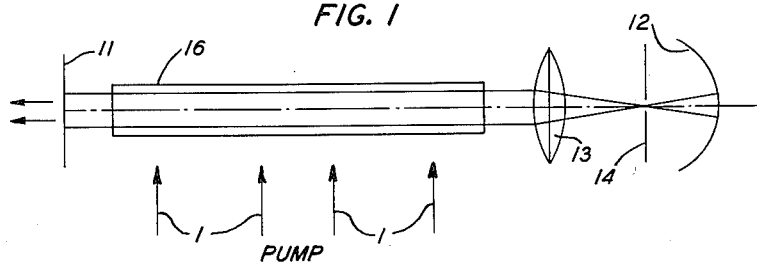

April 19, 1966   J. E. GEUSIC ET AL   3,247,467
DIFFRACTION LIMITED OPTICAL MASER
Filed Sept. 28, 1962   2 Sheets-Sheet 1

INVENTORS J. E. GEUSIC
J. G. SKINNER
BY
ATTORNEY

April 19, 1966  J. E. GEUSIC ETAL  3,247,467
DIFFRACTION LIMITED OPTICAL MASER
Filed Sept. 28, 1962  2 Sheets-Sheet 2

INVENTORS J. E. GEUSIC
J. G. SKINNER
BY
ATTORNEY

United States Patent Office 3,247,467
Patented Apr. 19, 1966

3,247,467
DIFFRACTION LIMITED OPTICAL MASER
Joseph E. Geusic, Berkeley Heights, and John G. Skinner, Stirling, N.J., assignors to Bell Telephone Laboratories, Incorporated, New York, N.Y., a corporation of New York
Filed Sept. 28, 1962, Ser. No. 226,975
4 Claims. (Cl. 331—94.5)

This invention relates to optical masers and more particularly to such devices employing cavity resonators adapted to produce a coherent output beam with a minimum of angular divergence.

The recent invention of the optical maser has made possible the generation and amplification of coherent electromagnetic wave in the optical frequency range which is generally considered to extend from the far infrared of the spectrum through the ultraviolet. Due to the extremely high frequency associated with wave energy in this range, the coherent waves produced by optical maser devices are capable of transmitting enormous quantities of information. Thus, the resultant extension of the useable portion of the electromagnetic spectrum has greatly increased the number of frequency channels available for communications and other uses. In addition, the coherent and relatively monochromatic light beam produced by an optical maser is inherently capable of being focused to an extremely small spot, thereby opening the door to applications such as precision drilling, cutting, welding and even surgical processes requiring localized high energy density. In a number of applications of optical masers it is highly desirable that the coherent output beam be as near perfectly collimated as possible to minimize its angular divergence or spread. In a long distance terrestrial optical maser communication system, for example, or in a system which includes a transmission path between a planet and space vehicle or between two space vehicles, even a very small amount of beam spread may be unacceptable. A highly collimated beam, on the other hand, offers advantages in effective range and economy of transmitted power as well as in security—freedom from detection or interference, either natural or man-made.

The angular spread of a perfectly collimated beam is ultimately determined by diffraction effects caused by the finite size of the aperture through which it must be emitted. In one type of optical maser this aperture is normally a partially reflective, partially transmissive member forming one end of an elongated optical cavity resonator. To produce an output beam with angular divergence reduced to the theoretical diffraction limit, the resonator must be adapted to operate in substantially a single axial mode.

An object of this invention therefore is to produce a diffraction limited coherent light beam.

Another object of the invention is to enable an optical maser utilizing an optical cavity resonator to operate in substantially a single axial mode.

These and other objects of the invention are achieved in one illustrative embodiment thereof comprising an elongated optical cavity resonator formed by a planar reflector and a concave spherical reflector axially spaced therefrom. An active optical maser medium is disposed within the cavity. Also positioned inside the cavity is a converging lens having a focal point coincident with the center of curvature of the concave reflector. A mode selecting member having a light transmitting aperture is positioned at the focal point of the lens.

It is a feature of the invention that the optical cavity resonator comprises means adapted to focus at an interior point light rays emitted from the active maser medium. A characteristic Fraunhofer diffraction pattern is formed at the focal point.

A further feature of the invention is that the light transmitting aperture situated at the interior focal point is adapted to transmit light rays encompassed in a selected bright portion of the Fraunhofer diffraction pattern.

Figure 6:
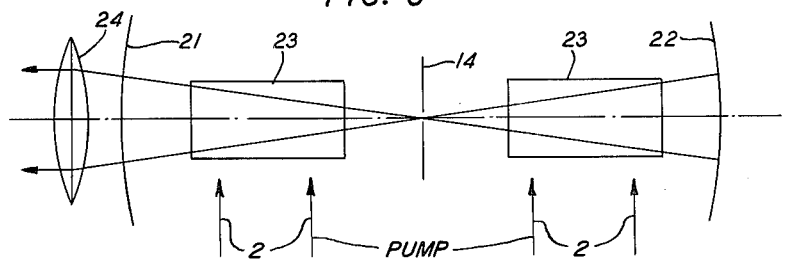

The above mentioned, as well as other objects and features of the invention, will be fully understood from the following more detailed discussion taken in conjunction with the accompanying drawing in which:

FIGS. 1 and 6 depict illustrative embodiments of diffraction limited optical maser as disclosed herein, while FIGS. 2, 3, 4, and 5 are diagrams helpful in explaining the principles of the invention.

Referring now to FIG. 1 there is shown in schematic form an illustrative embodiment of the invention comprising an optical cavity resonator formed by a planar reflector 11 and a concave spherical reflector 12 axially spaced therefrom. Reflector 11 is partially transmissive to permit coupling the resonator to an external circuit, although in some instances it may be advantageous to couple through the reflector 12. A converging lens 13 is positioned within the cavity so that its focal point coincides with the center of curvature of the spherical reflector 12. An apertured member 14 is situated at the focal point to prevent the buildup of off-axial cavity modes as explained herein. The active maser medium indicated in the figure by the rod-like structure 16 is also situated within the cavity, preferably in the gap between the planar reflector 11 and the lens 13. The active medium 16, which may be any one of those known in the optical maser art, has associated with it pumping apparatus for establishing therein the negative temperature condition which is a prerequisite for optical maser action. Inasmuch as the pump apparatus may vary with the nature of the medium 16 it has been omitted from the drawing in the interest of clarity. However, the presence of a pumping source is indicated by the arrows 1, which represent pumping energy incident upon the active medium 16.

During operation of the device shown in FIG. 1 a population inversion between a selected pair of energy levels of the active medium 16 is maintained by the pump source. Light rays having a frequency corresponding to the separation between the inverted pair of energy levels are reinforced by stimulated emission as they pass through the medium. In the illustrative embodiment rays which travel along the axial dimension of the resonator are focused by the lens 13 and, disregarding for the moment the effect of the aperture 14, impinge on the concave surface of the spherical reflector 12. As the focused rays pass through the center of curvature of the reflector 12, they are substantially normally incident on the reflective surface and are, therefore, directed back through the active medium 16 where they are again reinforced by stimulated emission. Thus far the combined effect of the lens 13 and the reflector 12 is much the same as that of a planar reflector. That is, in terms of simple ray optics the optical cavity of the device shown in FIG. 1 is similar to the now familiar Fabry-Perot type of optical resonator, the mode structure of which has been analyzed in some detail by Fox and Li in the Bell System Technical Journal, volume 40, page 453.

Figure 2:
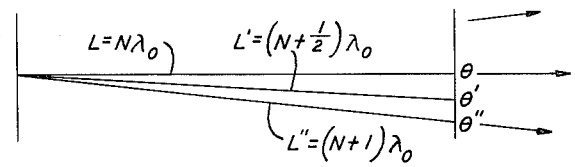

A Fabry-Perot type optical cavity resonator is ordinarily formed by a pair of spaced plane parallel reflectors. Due to the very high frequency of the light rays and the requirement that a substantial quantity of active medium be included within the cavity, the separation of the reflectors is necessarily several thousands of wavelengths at the operating frequency. Hence the cavity is inherently a multimode structure. For light rays parallel to the axis which are normally incident on the reflective surface, resonant conditions may be considered to be obtained when the length of the cavity is an integral number of half wavelengths. This is illustrated by FIG. 2 in which L is the distance between the reflectors, N is an integral number of half wavelengths and $\lambda_0$ is the light wavelength.

In addition to the axial modes there also exist a number of off-axial cavity modes which are inclined at discrete small angles to the axis. It is also required that the distance along the path of the off-axial modes be an integral number of half wavelengths as indicated by L' and L''. In general $L^{(n)} = (N + n/2) \times \lambda_0$. Light rays which traverse paths such as these will "walk off" the reflectors after a certain number of reflections. However, if the angle to the axis is small the number of reflections prior to "walk off" will be quite large so that the light rays interact strongly with the active medium and thus will contribute to the maser output beam. As a result, even if maser action occurs at but a single frequency, the output beam contains diverging components at angles $\theta'$ and $\theta''$, etc. The off-axial modes utilize portions of the power available at the wavelength $\lambda_0$ within the linewidth of the optical maser transition. Thus, in addition to causing a divergence of the beam, they tend to limit the power output in the preferred fundamental or axial mode.

Figure 3A:
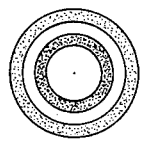
Figure 3B:
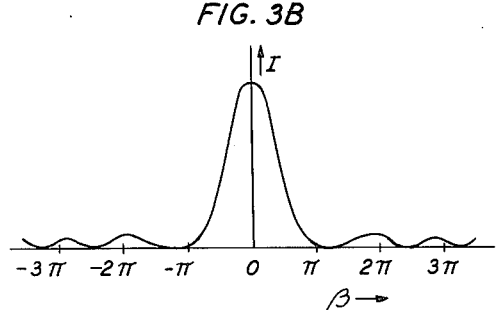

In accordance with the principles of the invention, the axial divergence of the light beam is converted to a linear displacement by means which bring to an interior focus the rays emitted from the active medium. As the medium is of finite extent the beam is, in effect, emitted through a finite aperture. Thus the converging lens or its equivalent forms a characteristic Fraunhofer diffraction pattern. For a circular aperture, the diffraction pattern has the familiar form depicted in FIG. 3A wherein a bright center spot is surrounded by alternatively dark and light rings. FIG. 3B indicates the relative intensity of the spot and rings as a function of $\beta$, the phase lag between wavelets at the center and at the edge of the aperture. Most of the energy in the axial modes appears in the bright center spot, while the remainder is distributed over the sequence of bright rings. Energy in many off-axial modes appears in the bright rings, although a portion is contributed to the center spot. Excitation of the off-axial modes in an optical maser of the invention is substantially prevented by the limiting aperture of the member 14 which is adapted to pass only light rays encompassed in the bright center spot. For a circular aperture the angle $\theta$ between the axis and the first dark ring of the diffraction aperture is equal to 1.22 $\lambda/D$ where D is the diameter of the effective aperture through which the light beam is emitted.

Figure 4:
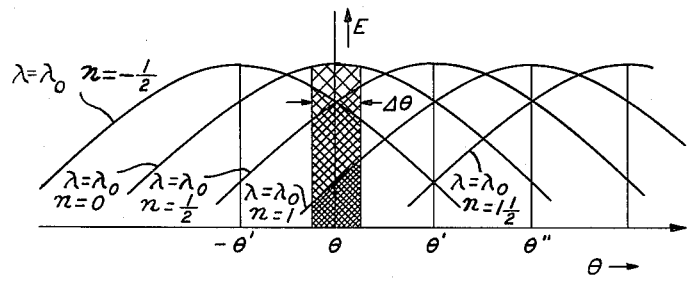

In an ordinary parallel plate optical resonator all of the modes at a particular wavelength $\lambda_0$ have the same probability of excitation. Thus, as shown in FIG. 4, there is an energy distribution centered about each discrete angle which corresponds to a resonant mode. That the light which is emitted at each angle includes contributions from the modes at all other angles is indicated by the overlapping shaded portions of the diagram.

Figure 5A:
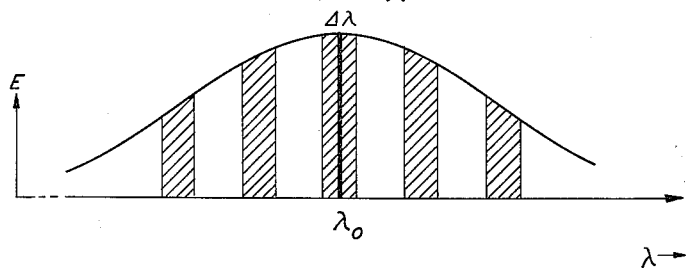

So far this discussion has been based on the assumption that the optical maser operates at but a single wavelength $\lambda_0$. Actually, however, the maser transition is typically broadened by interactions among the atomic and molecular particles of the active medium so that it extends over a range of frequencies. An exemplary distribution is shown by the curve in FIG. 5A. It is apparent that if wavelength other than $\lambda_0$ are permitted, then resonant cavity modes may exist for all wavelengths within the broadened maser line which measure an integral number of half wavelengths between the reflectors. The wavelengths of such modes which are indicated by the shaded areas in FIG. 5A are separated by $c/_{2L}$ where $c$ is the velocity of light in the cavity. Off-axial modes corresponding to those wavelengths will occur at angles between the principal and off-axial $\lambda_0$ modes. Representation of all modes in the diagram of FIG. 4 would tend to fill in the gaps in the family of $\lambda_0$ curves.

Figure 5B:
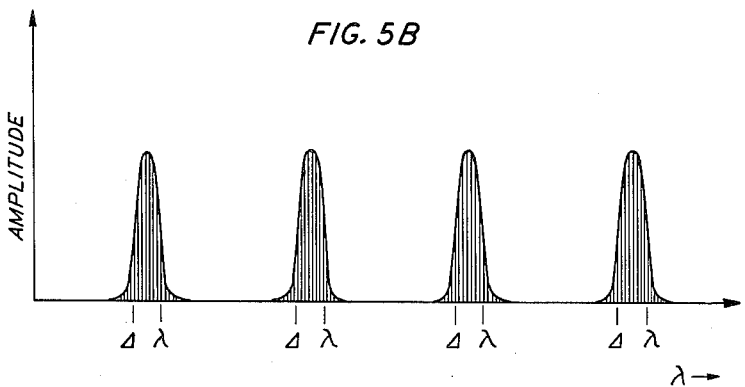

For an idealized resonator formed by perfect reflectors of infinite extent separated by a distance L which is much greater than the wavelength $\lambda$, the resonant modes are represented by the longer vertical lines of FIG. 5B. Each of the lines corresponds to a group of axial modes and a group of off-axial modes at the same wavelength but inclined at discrete angles to the axis. In an actual resonator, the end plates are not perfect reflectors with the result that the modes can no longer be represented as perfectly sharp spikes. Instead, they are broadened as indicated by the curve of FIG. 5B. A number of off-axial modes are thus permitted to exist at wavelengths close to those of the axial modes. These are indicated by the shorter vertical lines under the curve.

In the resonator of the invention, the off-axial modes are controlled by the diffraction limiting aperture which has the effect of suppressing off-axial modes at the principal wavelengths which diverge more than the diffraction angle, and, at the same time, limiting the wavelength spread $\Delta\lambda$ over which other off-axial modes can exist. Thus, in a cavity formed by reflectors of given size and separation, a higher degree of frequency selectivity can be obtained with the invention than is otherwise possible. In a resonator formed by perfect reflectors the width of the cavity modes is limited primarily by the fact that off-axial light rays tend to "walk off" the resonator reflectors. Therefore, the mode width is determined by the relation of the cavity length to the size of end plates. In accordance with this invention however, the width of the mode is controlled by a diffraction limiting aperture. This can be understood by noting that, as shown by FIG. 4, the maximum width of the principal mode is equivalent to the separation between the $-\theta'$ and the $\theta'$ modes which corresponds to the distance between the peaks of the energy distribution curves labeled $n = -\frac{1}{2}$ and $n = \frac{1}{2}$.

It follows from the above that a further advantage of the invention is that a very narrow emission line can be obtained without the need for an optical filter having an equivalently narrow pass band. For instance, to obtain an emission line having a width $\Delta\lambda$ from an optical maser employing the invention it is only necessary to utilize a filter capable of discriminating between the various principal modes within the broadened optical transition of the active medium. In a gas maser using a one meter cavity the separations between the principal modes is about 150 megacycles. $\Delta\lambda$ may be measured in tens of kilocycles. The difficult of providing an optical filter of such selectivity is much greater than that of discriminating between modes separated by 150 megacycles.

A second illustrative embodiment of the invention depicted in FIG. 6 employs an optical resonator of the confocal type. A detailed analysis of confocal resonators may be found in the article by Boyd and Kogelnik in Volume 41 of the Bell System Technical Journal, page 1347. In the drawing axially spaced concave spherical reflectors 21 and 22 define the ends of the resonator cavity. The active medium is divided into two portions, both of which are indicated by the reference numeral 23. Each portion is situated in the resonator at a position where it may most efficiently interact with the optical electromagnetic field therein. The reflector 21 is partially transmissive to permit coherent light to be abstracted by utilization. An external lens 24 may be provided if desired to convert the divergent coherent beam into a parallel bundle of rays. A diffraction limiting aperture 14 positioned at an interior focal point is adapted to transmit selected bright portions of the Fraunhofer diffraction pattern, thereby accomplishing mode selection. A pumping source, not shown, provides pumping power to the active medium, as indicated by the arrows 2.

An optical maser embodying the principles of the invention has been successfully operated. The optical cavity was formed by a planar reflector and a concave spherical resonator as illustrated in FIG. 1. The planar resonator was about 8 percent transmissive and formed the emergent face for the maser beam. A converging lens having a focal length of 20 centimeters was positioned within the cavity with its focal point coincident with the center of curvature of the spherical reflector. The active medium was a ruby rod three inches long and one quarter inch in diameter. The diameter of the maser beam within the ruby was about .60 centimeters. The diffraction angle for this size beam is about $1.6 \times 10^{-4}$ so that the center spot of the diffraction pattern should theoretically be about 0.0022 inch. However, Fox and Li have shown that the amplitude of the maser beam is not uniform across its diameter but, instead, varies approximately as the cosine. This distribution tends to increase the divergence of the diffracted beam by about 50 percent so that the limiting aperture should be about 0.0033 inch. At a distance of 12 meters the beam diameter should be about 0.54 inch. In the device tested, the aperture was 0.003 inch and the beam diameter at 12 meters was found to be approximately .60 centimeters. When the same ruby was operated with a parallel plate resonator but without the limiting aperture, the beam diameter at the same distance was four inches.

Although the invention has been described with particular reference to specific illustrative embodiments many variations and modifications are possible and may be made by those skilled in the art without departing from its scope and spirit.

What is claimed is:
1. An optical maser for producing a substantially diffraction limited output beam, comprising
   means forming an optical cavity resonator,
   a negative temperature medium disposed within said resonator,
   means for pumping said medium to produce coherent light wave energy by stimulated emission therefrom,
   said cavity resonator being adapted to focus at an interior point light rays emitted from said medium,
   aperture means positioned at said interior focal point of said light rays,
   said aperture means being so dimensioned to pass only the bright center spot of the Fraunhofer diffraction pattern at said focal point whereby only light rays encompassed in said spot are caused to resonate in said cavity,
   and means for abstracting coherent wave energy from said cavity.

2. An optical maser as claimed in claim 1 wherein said resonator is a confocal resonator.

3. An optical maser for producing a substantially diffraction limited output beam, comprising
   means forming an optical cavity resonator,
   a negative temperature medium disposed within said resonator,
   means for pumping said medium to produce coherent light wave energy by stimulated emission therefrom,
   means within said resonator for focusing at an interior point light rays emitted from said medium,
   aperture means positioned at said interior focal point of said focusing means for passing light rays encompassed in only the bright center spot of the Fraunhofer diffraction pattern whereby only said rays are permitted to resonate in said cavity,
   and means for abstracting coherent wave energy from said cavity.

4. An optical maser for producing a substantially diffraction limited output beam, comprising
   an optical cavity resonator formed by a planar reflector and a concave spherical reflector spaced therefrom,
   a negative temperature medium disposed within said resonator,
   means for pumping said medium to produce coherent light wave energy by stimulated emission therefrom,
   means within said cavity resonator for focusing light rays emitted from said medium,
   the focal point of said focusing means being coincident with the center of curvature of said spherical reflector,
   aperture means positioned at said focal point for passing light rays encompassed in only the bright center spot of the Fraunhofer diffraction pattern whereby only said rays are permitted to resonate in said cavity,
   and means for abstracting coherent wave energy from said cavity.

References Cited by the Examiner
UNITED STATES PATENTS

| | | | |
|---|---|---|---|
| 2,929,922 | 3/1960 | Schawlow et al. | 88—61 |
| 3,055,257 | 9/1962 | Boyd et al. | 88—1 |
| 3,059,117 | 10/1962 | Boyle et al. | 88—61 |

OTHER REFERENCES

Baker et al.: "Mode Selection and Enhancement With a Ruby Laser," Applied Optics, vol. 1, No. 5, September 1962, page 674 (published August 25, 1962).

Katzman et al.: "Optical Maser Utilizing Multiple Ruby Sections in a Spherical Resonator," Journal of the Optical Society of America, volume 52, No. 5, May 1962, page 602.

Rigrod et al.: "Gaseous Optical Masers With External Concave Mirrors," Journal of Applied Physics, volume 33, No. 2, February 1962, pages 743 and 744.

JEWELL H. PEDERSEN, *Primary Examiner.*

J. L. CHASKIN, R. L. WIBERT, *Assistant Examiners.*